(12) United States Patent
Balan et al.

(10) Patent No.: US 7,595,122 B2
(45) Date of Patent: *Sep. 29, 2009

(54) INTERCONNECT SUPPORTED ELECTROLYZER ASSEMBLY, PREFORM AND METHOD OF FABRICATION

(75) Inventors: Chellappa Balan, Niskayuna, NY (US); Michael John Bowman, Niskayuna, NY (US); Kenneth Walter Browall, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 888 days.

This patent is subject to a terminal disclaimer.

(21) Appl. No.: 10/955,508

(22) Filed: Oct. 1, 2004

(65) Prior Publication Data

US 2005/0061664 A1    Mar. 24, 2005

Related U.S. Application Data

(63) Continuation-in-part of application No. 10/166,909, filed on Jun. 11, 2002.

(51) Int. Cl.
*H01M 8/00* (2006.01)
*H01M 4/00* (2006.01)
*B05D 5/12* (2006.01)

(52) U.S. Cl. ............... 429/12; 427/115; 429/40
(58) Field of Classification Search ........... 429/12, 429/38, 39, 40
See application file for complete search history.

(56) References Cited

U.S. PATENT DOCUMENTS

| 3,993,653 A | | 11/1976 | Blum et al. | |
| 4,292,379 A | * | 9/1981 | Kothmann | 429/17 |
| 5,942,349 A | * | 8/1999 | Badwal et al. | 429/34 |
| 2002/0006539 A1 | * | 1/2002 | Kubota et al. | 429/44 |
| 2004/0124095 A1 | | 7/2004 | Fujimura et al. | |

FOREIGN PATENT DOCUMENTS

WO    WO97/35349    *   9/1997

* cited by examiner

*Primary Examiner*—Patrick Ryan
*Assistant Examiner*—Julian Mercado
(74) *Attorney, Agent, or Firm*—Patrick K. Patnode

(57) ABSTRACT

An electrolyzer assembly comprises at least one electrolyzer cell including at least two electrodes and an electrolyte interposed therebetween. The electrolyzer assembly further comprises an interconnect structure in intimate contact with at least one of the two electrodes or the electrolyte. The interconnect structure includes at least one flow channel initially defined by a removable sacrificial material, wherein the interconnect structure is configured to provide support for the electrodes and the electrolyte.

31 Claims, 5 Drawing Sheets

INTERCONNECT SUPPORTED ELECTROLYZER ASSEMBLY, PREFORM AND METHOD OF FABRICATION

This application is a continuation-in-part of application Ser. No. 10/166,909, filed Jun. 11, 2002 which is incorporated herein by reference.

BACKGROUND OF INVENTION

This invention relates generally to electrolyzers and more specifically to interconnect supported electrolyzer assemblies, preforms and methods of fabrication.

Electrolyzers, for example solid oxide electrolyzers, are electrochemical devices that have many potential applications including large-scale hydrogen generation for distributed or local supply. One of the key challenges is to develop cost effective processes to manufacture electrode and electrolyte materials, especially with large surface areas.

In the past, anode, cathode or electrolyte supported approaches were used for electrolyzer cell fabrication. It is desirable for each of these components to be thin, but the anode, cathode and electrolyte are all typically made of fragile based ceramics. Necessarily, in conventional cells, in order to provide support for cell fabrication, at least one of the components must be thick.

Accordingly, there is a need for an improved support approach for electrolyzer cell fabrication.

SUMMARY OF INVENTION

In one aspect, an electrolyzer assembly comprises at least one electrolyzer cell including at least two electrodes and an electrolyte interposed therebetween. The electrolyzer assembly further comprises an interconnect structure in intimate contact with at least one of the two electrodes or the electrolyte. The interconnect structure includes at least one flow channel initially defined by a removable sacrificial material, wherein the interconnect structure is configured to provide support for the electrodes and the electrolyte.

In another aspect, an interconnect preform comprises an interconnect support structure, wherein at least one flow channel is disposed within the interconnect support structure. A removable sacrificial material is disposed within the flow channel to provide a surface for deposition thereupon.

In yet another aspect, an electrolyzer assembly comprises at least one electrolyzer cell including at least two electrodes and an electrolyte interposed therebetween. The electrolyzer assembly further comprises an interconnect preform having an interconnect support structure in intimate contact with at least one of the two electrodes or the electrolyte and includes at least one flow channel disposed within the interconnect support structure. A removable sacrificial material is disposed within the flow channel to provide a surface for deposition thereupon.

In yet another aspect, a method of forming an electrolyzer assembly comprises providing an interconnect structure having at least one flow channel therein and depositing a sacrificial material into the at least one flow channel. The method further comprises depositing at least one electrode and an electrolyte material upon the interconnect structure and the sacrificial material, and processing the electrolyzer assembly to remove the sacrificial material.

DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
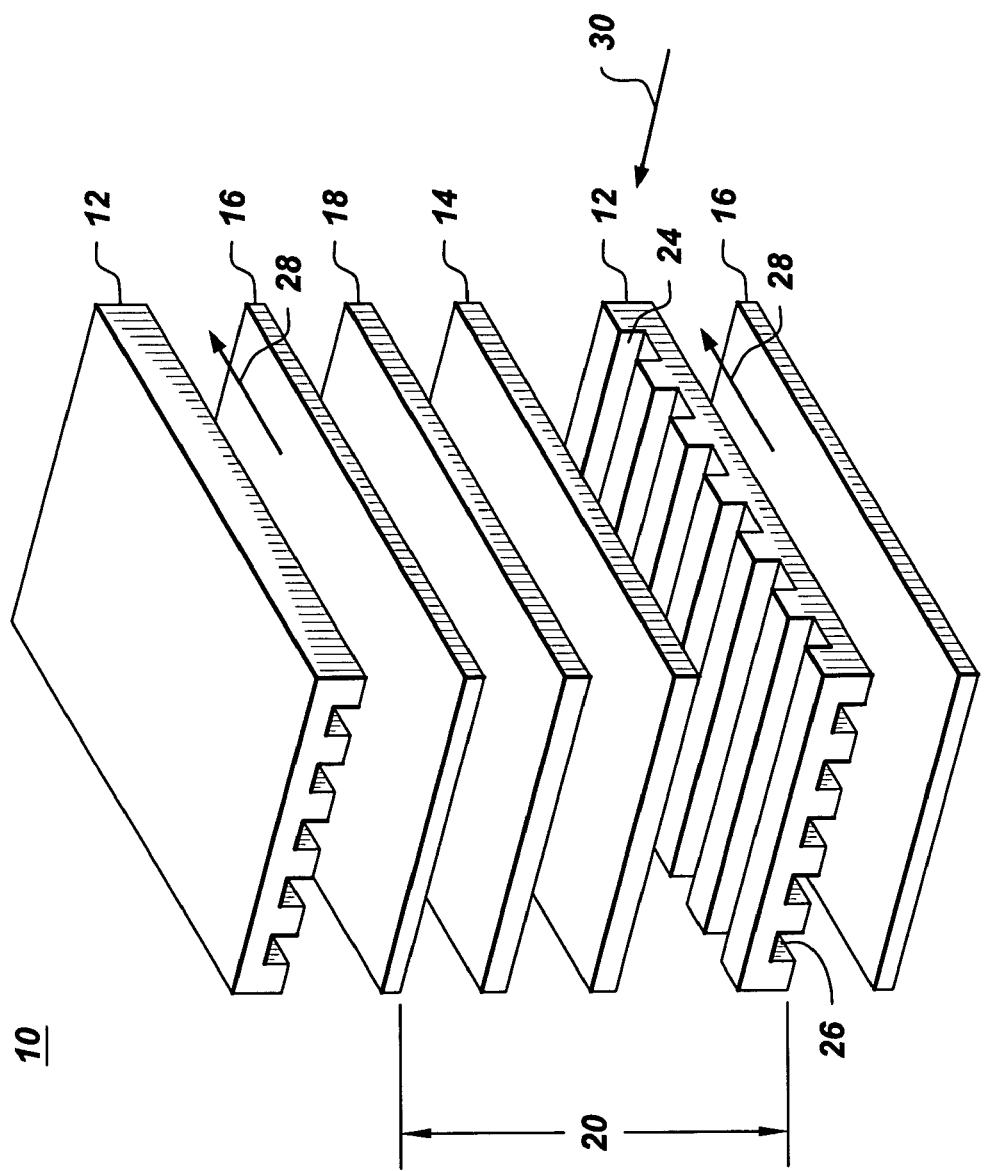
FIG. 1 illustrates a perspective view of an exemplary electrolyzer cell assembly illustrating one repeat unit.

An electrolyzer cell, for example a solid oxide electrolyzer cell, is a device that produces hydrogen by splitting water when electricity is applied. An exemplary planar electrolyzer cell 10 comprises an interconnect portion 12, a pair of electrodes, a cathode 14 and an anode 16, separated by an electrolyte 18, as shown in FIG. 1. Each electrolyzer cell 10 has a repeat cell unit 20 capable of being stacked together in series, in parallel or both to form an electrolyzer cell stack system or architecture capable of producing a certain amount of hydrogen.

Interconnect portion 12 defines a plurality of steam flow or steam and hydrogen channels 24 in intimate contact with the cathode 14 and a plurality of oxygen flow channels 26 in intimate contact with the anode 16 of an adjacent cell repeat unit 20. During operation, a steam flow 30 is supplied to the steam flow channels 24.

Figure 2:
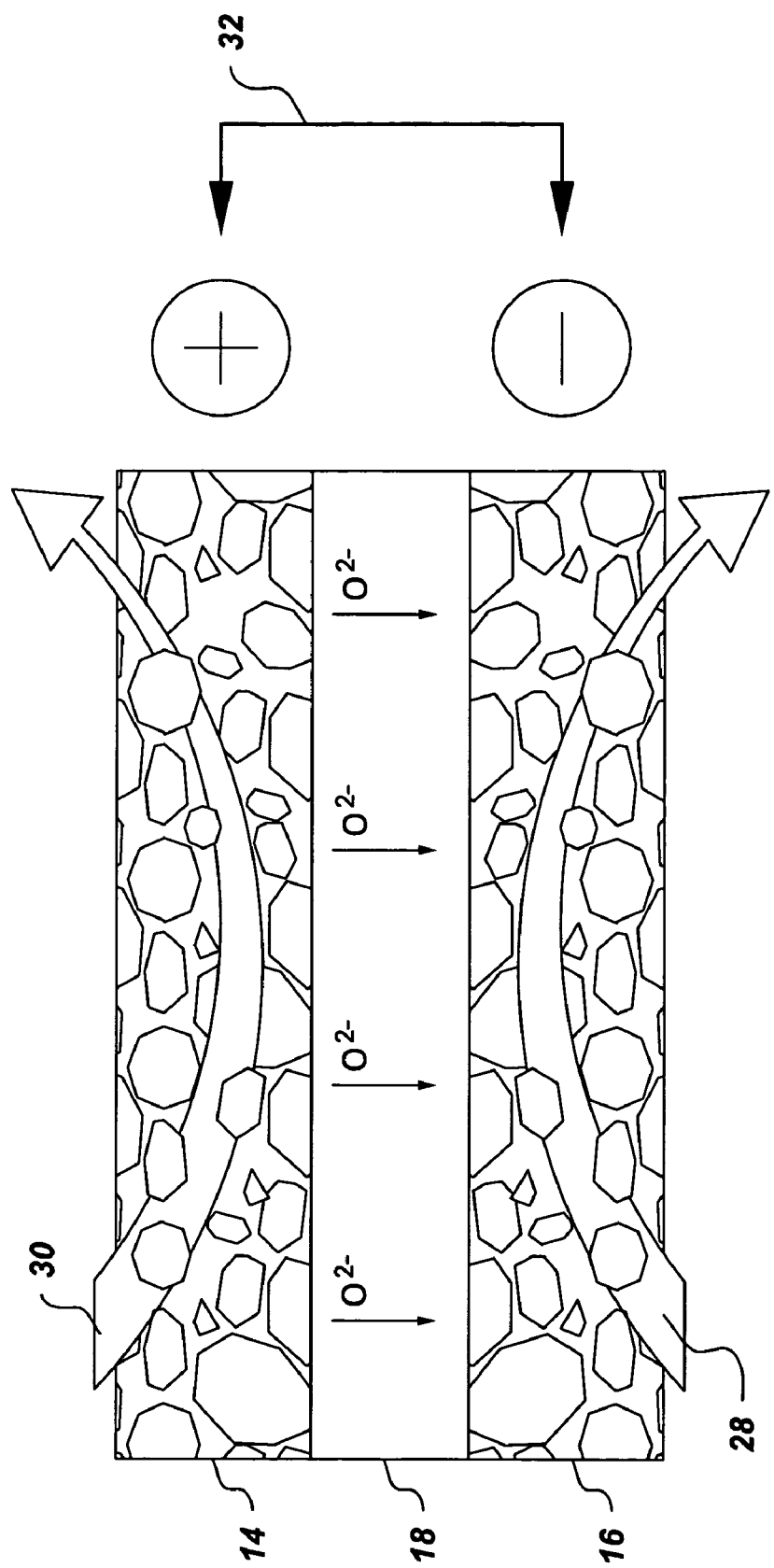
FIG. 2 illustrates operation of an exemplary electrolyzer cell.

As shown in FIG. 2, the steam flow 30 is fed to the cathode 14 and is dissociated with electrons from externally provided electricity source 32. In operation, once electrical energy is applied through an external source 32, steam is dissociated with electrons from externally provided electricity on the surface of the cathode 14. In this dissociation reaction, hydrogen molecules are formed at the surface of the cathode 14. Simultaneously oxygen ions migrate to anode 16 through the electrolyte 18 and form oxygen molecules on the surface of the anode 16 with the release of electrons. Thus steam 30 is dissociated to form products of hydrogen and oxygen, which products are separated in the process. The hydrogen produced by this process has high purity. In some embodiments, oxygen is collected from anode 16 using a flow of a secondary fluid. The secondary fluid includes, but is not limited to air or nitrogen. In some embodiments, the secondary fluid may also include reactive gases including but not limited to carbon monoxide (CO).

Figure 3:
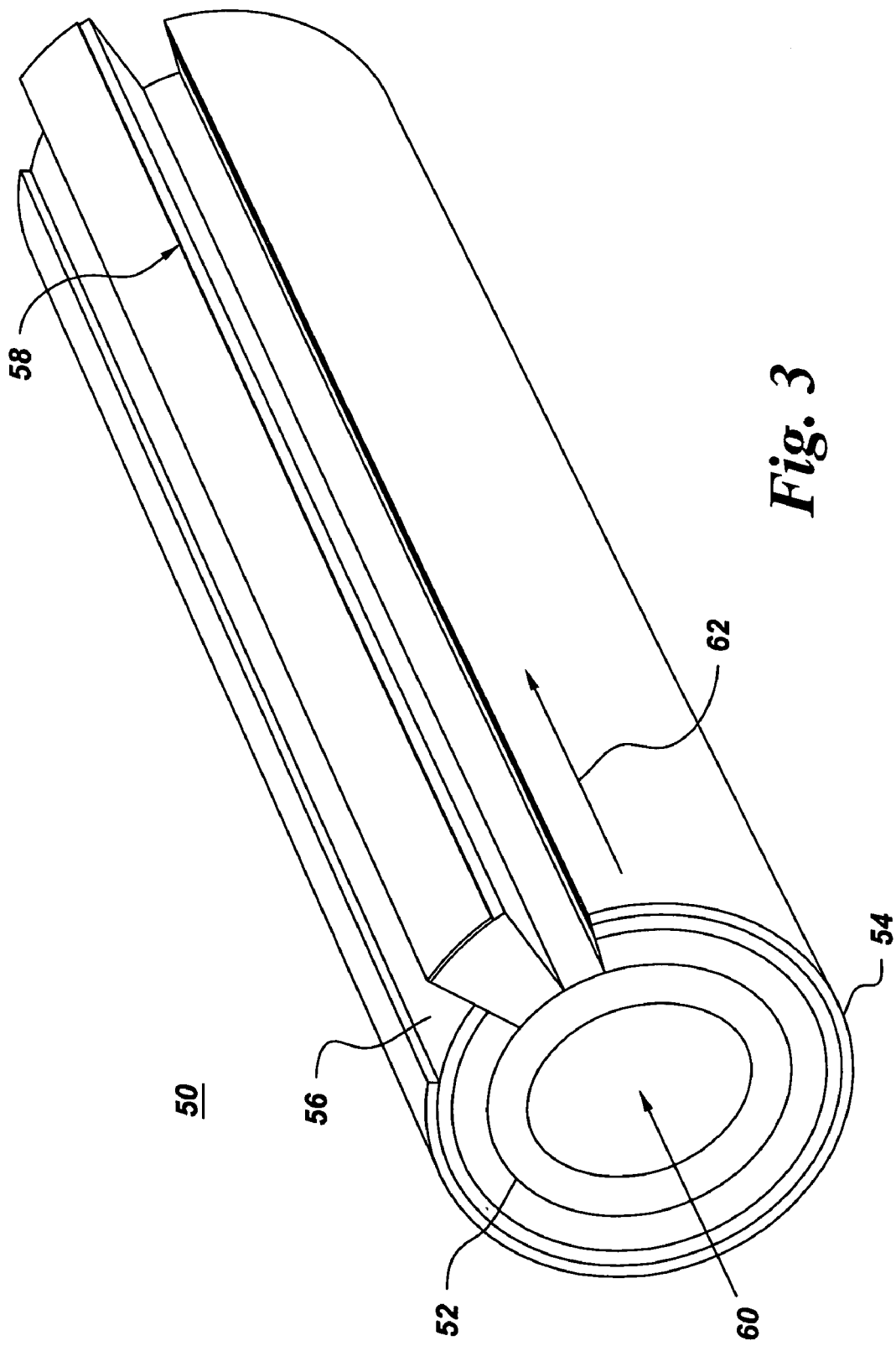
FIG. 3 illustrates a diagrammatical view of an exemplary tubular electrolyzer cell assembly.
Figure 4:
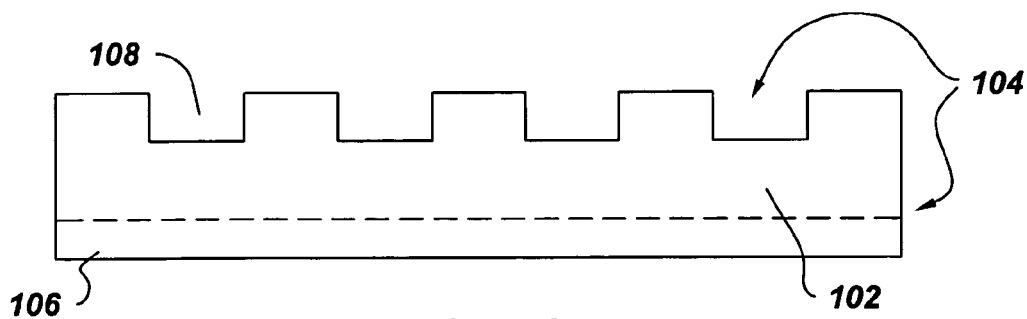
FIG. 4 illustrates a side view of an exemplary interconnect.

In another embodiment, an exemplary tubular electrolyzer cell 50 comprises an inner cathode tube 52, an outer anode tube 54, and an electrolyte layer 56 disposed therebetween, as shown in FIG. 3. An interconnect 58 is disposed on the cathode tube 54 and is in intimate contact with the electrolyte layer 56. Each tubular electrolyzer cell 50 is a repeat cell unit capable of being bundled together in series, in parallel or both to form an electrolyzer cell bundle or architecture capable of producing a specific amount of hydrogen.

In operation, a steam flow 60 is supplied within inner cathode tube 52 and an oxygen flow 62 is produced upon the outer surface of outer anode tube 52. The steam flow 60 is dissociated in the similar manner as discussed above.

The number of individual cells in a stack or bundle determines the capacity to produce hydrogen in an electrolyzer cell system. One of the key challenges is to develop cost effective processes to manufacture anode, cathode and electrolyte materials, each having a relatively thin cross-sections, to reduce resistive losses, with large surface areas to minimize fabrication and assembly costs.

In accordance with one embodiment of the present technique, an interconnect supported planar electrolyzer cell 100 is shown in FIGS. 4-7.

An interconnect portion 102 defines a plurality of fluid flow channels 104 disposed within the body of the interconnect portion 102. A portion of the fluid flow channels 104 are airflow channels 106 and a portion of the fluid flow channels 104 are fuel flow channels 108. The primary function of the interconnect portion 102 is to electrically connect the anode of one repeatable cell unit to the cathode of an adjacent cell unit. In addition, the interconnect portion 102 should provide uniform current distribution, should be impermeable to gases, stable in both reducing and oxidizing environments and adequately conductive to support electron flow at a variety of temperatures. The interconnect portion 102 can be made of a number of materials having these properties, including but not limited to, thin-formed metal, stainless steel, cobaltite, ceramic, $LaCrO_3$, $CoCr_2O_4$, INCONEL® 600, INCONEL® 601, HASTELLOY® X, and HASTELLOY®-230 and combinations thereof. INCONEL® is a registered trademark of Special Metals Corporation of New Hartford, N.Y., U.S.A. that refers to a family of austenitic nickel-based superalloys. HASTELLOY® is a registered trademark of Haynes International, Inc. of Kokomo, Ind., U.S.A. that refers to a range of over twenty different highly corrosion-resistant and high-temperature metal superalloys. The interconnect portion 102 typically has a thickness in the range between about 0.1 mm to about 5 mm and preferably between about 0.25 mm to about 0.5 mm.

Figure 5:
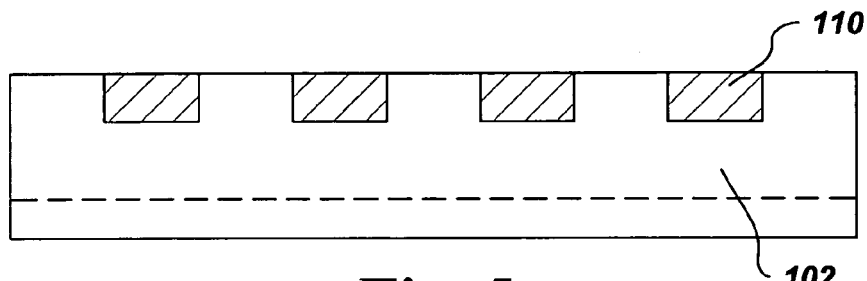
FIG. 5 illustrates a side view of an exemplary interconnect of FIG. 4, wherein the fluid flow channels are filled with sacrificial material.

In order to support cell fabrication, the interconnect portion 102 must provide an appropriate surface for depositing, coating or otherwise disposing (hereinafter deposition) electrode or electrolyte materials. Accordingly, at least a portion of the fluid flow channels 104 are filled with a sacrificial material 110 to provide a relatively uniform support surface on interconnect portion 102, suitable for deposition, as shown in FIG. 5. The sacrificial material 110 fills the fluid flow channels 104 and provides a temporary substrate for deposition of electrode or electrolyte materials. The use of the interconnect portion 102 as a support structure for cell fabrication provides a low-cost, large-area fabrication mechanism allowing for layer-by-layer deposition upon the interconnect portion 102. Interconnect portion 102 can have a fluid flow channel 104 with a uniform cross-section or a divergent cross-section, a tubular, rectangular or other metal-formable geometry.

The sacrificial material 110 can be made of any material that can provide a temporary substrate for deposition of the electrode or electrolyte materials and be removed with appropriate processing after the deposition process is completed. The sacrificial material 110 can be, for example, a polymer, a salt, a polymer foam, soluble materials, polyurethane, paraffin, low density foamed polymers or the like. Processes for removable of the sacrificial material 110 can include heating, chemical etching, ablation, dissolution or any appropriate removal process for the corresponding sacrificial material 110.

Figure 6:
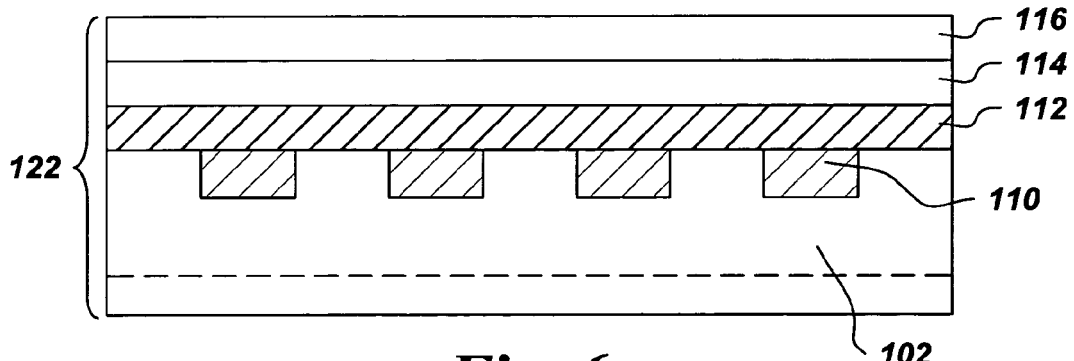
FIG. 6 illustrates a side view of an exemplary electrolyzer cell assembly.

An anode layer 112 is disposed upon the interconnect portion 102 and the sacrificial material 110 substrate, typically via deposition or by placement of an anode sheet or the like, as shown in FIG. 6. It is recognized that either electrode material (anode or cathode) or the electrolyte material or a combination thereof could be initially deposited or otherwise provided upon the interconnect portion 102 and sacrificial material 110 substrate preform. The use of the anode layer 112 as the first layer is for purpose of example only.

The main purpose of anode layer 112 is to provide reaction sites for the release of oxygen after releasing electrons. Accordingly, the anode layer 116 must be stable in the oxidizing environment, have sufficient electronic conductivity and surface area at the electrolyzer cell operating conditions and have sufficient porosity to allow gas transport. The anode layer 116 can be made of a number of materials having these properties, including but not limited to, an electrically conductive oxide, perovskite, doped $LaMnO_3$, Sr-doped $LaMnO_4$ (LSM), tin doped Indium Oxide ($In_2O_3$), Strontium-doped $PrMnO_3$, $LaFeO_3$—$LaCoO_3$ $RuO_2$-YSZ, La Cobaltite, and combinations thereof.

An electrolyte layer 114 is disposed upon the anode layer 112, typically via deposition, as shown in FIG. 6. The main purpose of electrolyte layer 114 is to conduct ions between the anode layer 112 and a cathode layer 116. The electrolyte layer 114 carries ions produced at one electrode to the other electrode to balance the charge from the electron flow and complete the electrical circuit in the electrolyzer cell 100. Additionally, the electrolyte 114 separates the product gases in the electrolyzer cell 100. Accordingly, the electrolyte 114 must be stable in both the reducing and oxidizing environments, impermeable to the product gases and adequately conductive at the operating conditions. Typically, the electrolyte layer 114 is substantially electronically insulating. The electrolyte layer 114 can be made of a number of materials having these properties, including but not limited to, $ZrO_2$, YSZ, doped ceria, $CeO_2$, Bismuth sesquioxide, pyrochlore oxides, doped zirconates, perovskite oxide materials and combinations thereof.

Electrolyte layer 114 typically has a thickness such that electrolyte is substantially gas impermeable. The thickness of electrolyte layer 114 is typically less than 50 μm, preferably in the range between about 0.1 μm thick to about 10 μm, and most preferably in the range between about 1 μm thick to about 5 μm thick.

A cathode layer 116 is disposed upon the electrolyte 114 to complete the repeatable cell unit 122, as shown in FIG. 6. In addition, the cathode material should be stable in the steam or steam and hydrogen environment, have adequate electronic conductivity, surface area and catalytic activity for the steam dissociation at the electrolyzer cell operating conditions and have sufficient porosity to allow steam transport to the reaction sites. The cathode 116 can be made of a number of materials having these properties, including but not limited to, metal, nickel (Ni), Ni alloy, nickel (Ni), Ni alloy, silver (Ag), copper (Cu), noble metals, gold, platinum, palladium, rhodium and iridium, cobalt, ruthenium, Ni-yttria stabilized zirconia (YSZ) cermet, Cu-YSZ cermet, Ni-ceria, cermet, ceramics or combinations thereof.

Electrodes 112 and 116 typically have a surface area sufficient to support electrochemical reaction, for example in the range between about 1 m2/g to about 1000 m2/g. Electrodes 112, 114 are typically thermally stable between about 80 C to about 1000 C and preferably between about 300 C to about 1000 C.

Figure 7:
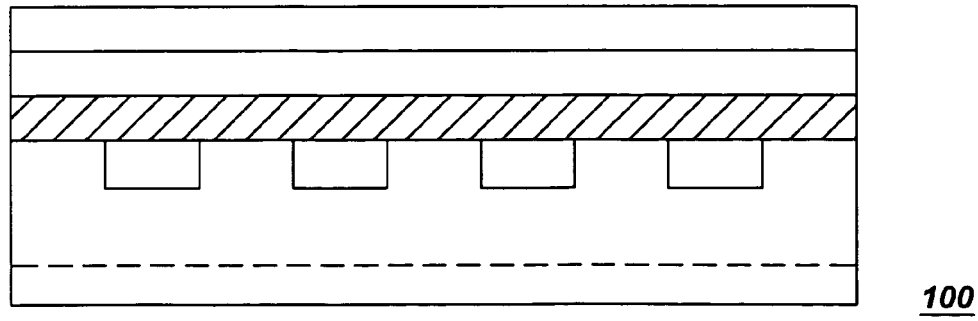
FIG. 7 illustrates a side view of an exemplary electrolyzer cell assembly of FIG. 6, wherein the sacrificial material is removed.

The electrolyzer cell 100 is processed to remove the sacrificial material 110 from the oxygen flow channels 108 and the fluid flow channels 104 are opened, as shown in FIG. 7.

Electrolyzer cell 100 can be any type of electrolyzer cell that requires flow channels including but not limited to solid oxide electrolyzer cells, molten carbonate electrolyzer cells, phosphoric acid electrolyzer cells, alkaline electrolyzer cells, regenerative electrolyzer cells, zinc air electrolyzer cells, or protonic ceramic electrolyzer cells.

Figure 8:
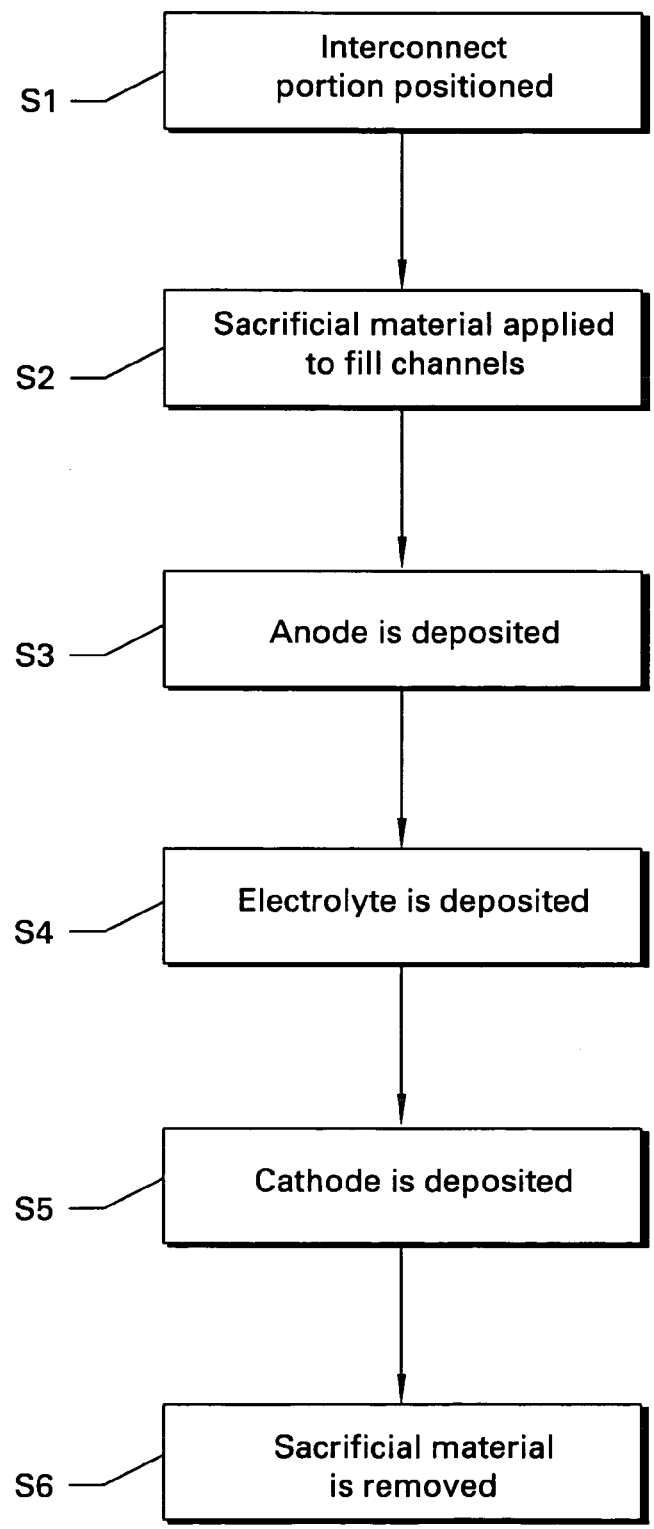
FIG. 8 illustrates a flow chart depicting an exemplary process for fabrication of an interconnect supported electrolyzer assembly.

FIG. 8 is a flow chart that depicts an exemplary process for fabrication of an interconnect supported electrolyzer cell such as planar electrolyzer cell 100.

First, the interconnect portion is positioned for deposition (S1). The interconnect portion can be made, for example, from stamped sheet metal such as stainless steel or the like. Next, a sacrificial material is deposited within the fluid flow channels of the interconnect portion to provide a substrate for layer-by-layer deposition of the electrodes and the electrolyte (S2). The sacrificial material, for example a foam, is sprayed, poured, or otherwise applied so as to fill the fluid flow channels. Necessary intermediate steps are taken so as to prevent the sacrificial material from interfering with subsequent deposition of the electrode or electrolyte materials. One example of an intermediate steps would be to dispose a substantially flat sheet upon the interconnect so as to cover the fluid flow channels. The sacrificial material is then introduced via the fluid flow channel openings on either side of the interconnect support and the channels are filled until the foam completely fills the channels and contacts the top sheet. The sheet is then removed from the interconnect portion and the deposition of the next layer can be completed. Another example of an intermediate step is introducing the sacrificial material into the fluid flow channels until the channels are completely filled or slightly overflowing. Any residue or overflow of the sacrificial material is then scraped off of the interconnect so as to planarize the substrate and provide a flat, clean surface for deposition.

In the next two steps, one of the electrode materials, in this exemplary case the anode material, is deposited upon the interconnect-sacrificial material substrate (S3) and the electrolyte material is deposited upon the anode materials (S4). Subsequently, the cathode material is deposited upon the electrolyte material (S5). Finally, the interconnect supported electrolyzer cell is processed to remove the sacrificial material (S6).

Many processes can be utilized to deposit or otherwise dispose the electrode or electrolyte materials upon the substrate, including but not limited to, sputtering, sol-gel, tape calendaring, jet vapor deposition, expanding thermal plasma deposition (discussed in greater detail in co-pending, commonly assigned application Ser. No. 10/063,939, entitled "Method for Manufacturing Fuel Cells and Articles Made Therewith," which application is hereby incorporated by reference) electrophoretic deposition, plasma enhanced chemical vapor deposition, CVD, PVD, atmospheric plasma spray, vacuum plasma spray or combinations thereof.

While the invention has been illustrated and described, it is not intended to be limited to the details shown, since various modifications and substitutions can be made without departing in any way from the spirit of the present invention. As such, further modifications and equivalents of the invention herein disclosed can occur to persons skilled in the art using no more than routine experimentation, and all such modifications and equivalents are believed to be within the spirit and scope of the invention as defined by the following claims.

What is claimed is:

1. An electrolyzer assembly comprising:
at least one electrolyzer cell including at least two electrodes and an electrolyte interposed therebetween; and
an interconnect support structure having an outer surface in intimate contact with at least one of said at least two electrodes and at least one flow channel disposed within said interconnect support structure, and a removable sacrificial material disposed within said at least one flow channel, wherein said sacrificial material substantially fills said at least one flow channel and combines with said outer surface of said interconnect support structure to provide a temporary, substantially planar support surface for said at least one electrolyzer cell.

2. The electrolyzer assembly in accordance with claim 1, wherein said electrolyte has a thickness such that said electrolyte is substantially gas impermeable.

3. The electrolyzer assembly in accordance with claim 2, wherein said electrolyte thickness is up to about 50 μm thick.

4. The electrolyzer assembly in accordance with claim 2, wherein said electrolyte thickness is in the range between about 0.1 μm thick to about 10 μm thick.

5. The electrolyzer assembly in accordance with claim 2, wherein said electrolyte thickness is in the range between about 1 μm thick to about 5 μm thick.

6. The electrolyzer assembly in accordance with claim 1, wherein said at least two electrodes have a surface area sufficient to support electrochemical reaction.

7. The electrolyzer assembly in accordance with claim 6, wherein said at least two electrodes have a surface area between about 1 $m^2/g$ and about 1000 $m^2/g$.

8. The electrolyzer assembly in accordance with claim 1, wherein said at least two electrodes comprise an anode and a cathode.

9. The electrolyzer assembly in accordance with claim 8, wherein said cathode is an electrically conductive oxide.

10. The electrolyzer assembly in accordance with claim 8, wherein said cathode is made of a material selected from the group consisting of doped $LaMnO_3$, Sr-doped $LaMnO_4$ (LSM), tin doped Indium Oxide ($In_2O_3$), perovskite, Strontium-doped $PrMnO_3$, $LaFeO_3$—$LaCoO_3$ $RuO_2$-YSZ, La Cobaltite, and combinations thereof.

11. The electrolyzer assembly in accordance with claim 8, wherein said anode is made of a material selected from the group consisting of Ni, Ni Alloy, Ag, Cu, Noble metals, Cobalt, Ruthenium, Ni-YSZ cermet, Cu-YSZ cermet, Ni-Ceria, cermet, ceramics or combinations thereof.

12. The electrolyzer assembly in accordance with claim 1, wherein said at least two electrodes are stable between about 80° C. to about 1000° C.

13. The electrolyzer assembly in accordance with claim 1, wherein said at least two electrodes are stable between about 300° C. to about 1000° C.

14. The electrolyzer assembly in accordance with claim 1, wherein said electrolyzer cell is selected from the group consisting of solid oxide electrolyzer cells, molten carbonate electrolyzer cells, phosphoric acid electrolyzer cells, alkaline electrolyzer cells, zinc air electrolyzer cells, and protonic ceramic electrolyzer cells.

15. The electrolyzer assembly in accordance with claim 1, wherein at least one of said at least two electrodes, said electrolyte or said interconnect are deposited upon said interconnect.

16. The electrolyzer assembly in accordance with claim 1, wherein said electrolyte is selected from the group consisting of $ZrO_2$, YSZ, doped ceria, $CeO_2$, Bismuth sesquioxide, 17. The electrolyzer assembly in accordance with claim 1, wherein said electrolyte is ion conducting and substantially electronically insulating.

18. The electrolyzer assembly in accordance with claim 1, wherein said at least one flow channel has a uniform cross-section.

19. The electrolyzer assembly in accordance with claim 1, wherein said at least one flow channel has one of a convergent or a divergent cross-section.

20. The electrolyzer assembly in accordance with claim 1, wherein said at least one flow channel is selected from the group consisting of tubular and rectangular, or other metal-formable geometry.

21. The electrolyzer assembly in accordance with claim 1, wherein said electrolyzer assembly provides uniform current distribution.

22. The electrolyzer assembly in accordance with claim 1, wherein said interconnect structure connects a plurality of electrolyzer cells in series.

23. The electrolyzer assembly in accordance with claim 1, wherein said interconnect structure comprises one of a metal, stainless steel, ceramic, $LaCrO_3$, an austenitic nickel-based superalloy, a metal superalloy, and combinations thereof.

24. The electrolyzer assembly in accordance with claim 1, wherein said interconnect structure has a thickness in the range between 0.1 mm to about 5 mm.

25. The electrolyzer assembly in accordance with claim 1, wherein said sacrificial material provides a temporary substrate for said electrodes or said electrolyte.

26. The electrolyzer assembly in accordance with claim 1, wherein said sacrificial material comprises a material selected from the group consisting of a polymer, a salt, a polymer foam, soluble materials, polyurethane, paraffin, and low density foamed polymers.

27. The electrolyzer assembly in accordance with claim 1, wherein said sacrificial material is removable by heating, chemical etching, ablation or dissolution.

28. An interconnect preform comprising:
an interconnect support structure having an outer surface;
at least one flow channel disposed within said interconnect support structure; and
a removable sacrificial material disposed within said flow channel to provide a surface, wherein said sacrificial material substantially fills said at least one flow channel and combines with said outer surface of said interconnect support structure to provide a temporary, substantially planar support surface suitable for a layer of electrode material to be directly deposited thereupon.

29. The interconnect preform in accordance with claim 28, wherein said sacrificial material comprises one of a polymer, a polymer foam, polyurethane, salt, paraffin, low density foamed polymer, and soluble materials.

30. The interconnect preform in accordance with claim 28, wherein said sacrificial material is removable by heating, chemical etching, ablation, or dissolution.

31. The electrolyzer assembly comprising:
at least one electrolyzer cell including at least two electrodes and an electrolyte interposed therebetween;
an interconnect preform comprising an interconnect support structure having an outer surface in intimate contact with at least one of said at least two electrodes and including at least one flow channel disposed within said interconnect support structure; and
a removable sacrificial material disposed within said flow channel, wherein said sacrificial material substantially fills said at least one flow channel and combines with said outer surface of said interconnect support structure to provide a temporary, substantially planar support surface suitable for deposition thereupon.

* * * * *

UNITED STATES PATENT AND TRADEMARK OFFICE
CERTIFICATE OF CORRECTION

PATENT NO. : 7,595,122 B2 Page 1 of 1
APPLICATION NO. : 10/955508
DATED : September 29, 2009
INVENTOR(S) : Balan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1333 days.

Signed and Sealed this

Twenty-eighth Day of September, 2010

David J. Kappos
*Director of the United States Patent and Trademark Office*